E. FIELD.
Corn Husker.
No. 92,295.
Patented July 6, 1869.
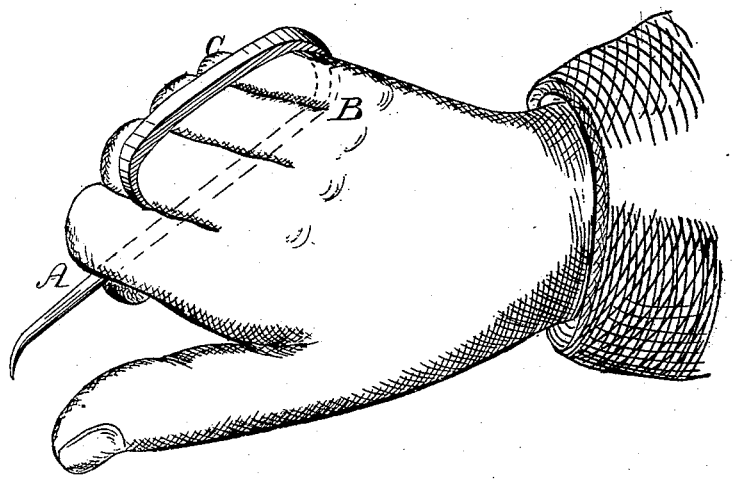
Witnesses.
Inventor:
E. Field.
per
Attorneys.

ELIHU FIELD, OF GENESEO, ILLINOIS.

Letters Patent No. 92,295, dated July 6, 1869.

IMPROVEMENT IN CORN-HUSKER.

The Schedule referred to in these Letters Patent and making part of the same.

*To all whom it may concern:*

Be it known that I, ELIHU FIELD, of Geneseo, in the county of Henry, and State of Illinois, have invented a new and improved Corn-Husker; and I do hereby declare that the following is a full, clear, and exact description thereof, which will enable others skilled in the art to make and use the same, reference being had to the accompanying drawing, forming part of this specification.

This invention relates to improvements in corn-husking implements, designed to provide a more useful implement than any now in use.

The invention consists in the arrangement of the shank of a bent pointed metallic instrument, to be held in the hand, so as to pass in a straight line across the inside of the fingers, and terminate in a bow, for taking in the three fingers, beginning with the little finger, leaving the fore-fingers free, for independent action with the thumb.

The drawing represents a perspective view of my improved husker, as held in the hand for operation.

A represents the shank of my improved husker, which I form in a straight line from the bend at the point, to pass across the inside of the hand at the joint of the fingers, with the hand to the bend B, or the beginning of the part C, forming the loop for connecting the implement to the fingers; and I make the part C of the loop long enough to envelop the three fingers, beginning with the little finger, turning the said part up and joining it with the shank, so as to pass between the fore and middle finger.

This arrangement prevents the implement from turning out of place in the hand, and permits free action of the fore-finger, thereby constituting a more efficient husker than any now in use.

Having thus described my invention,

What I claim as new, and desire to secure by Letters Patent, is—

The improved corn-husker, constructed as described, of the straight shank A, having a slightly-curved point, and bent at B, to form a loop, C, for the reception of the three fingers, exclusive of the index-fingers, as herein shown and described.

The above specification of my invention signed by me, this 2d day of March, 1869.

ELIHU FIELD.

Witnesses:
L. H. FIELD,
A. HOLDRIDGE.